March 7, 1933. W. H. CURTIS 1,900,333
PRESSURE CONTROLLING DEVICE FOR A LIQUID DISPENSING APPARATUS
Filed Sept. 12, 1932
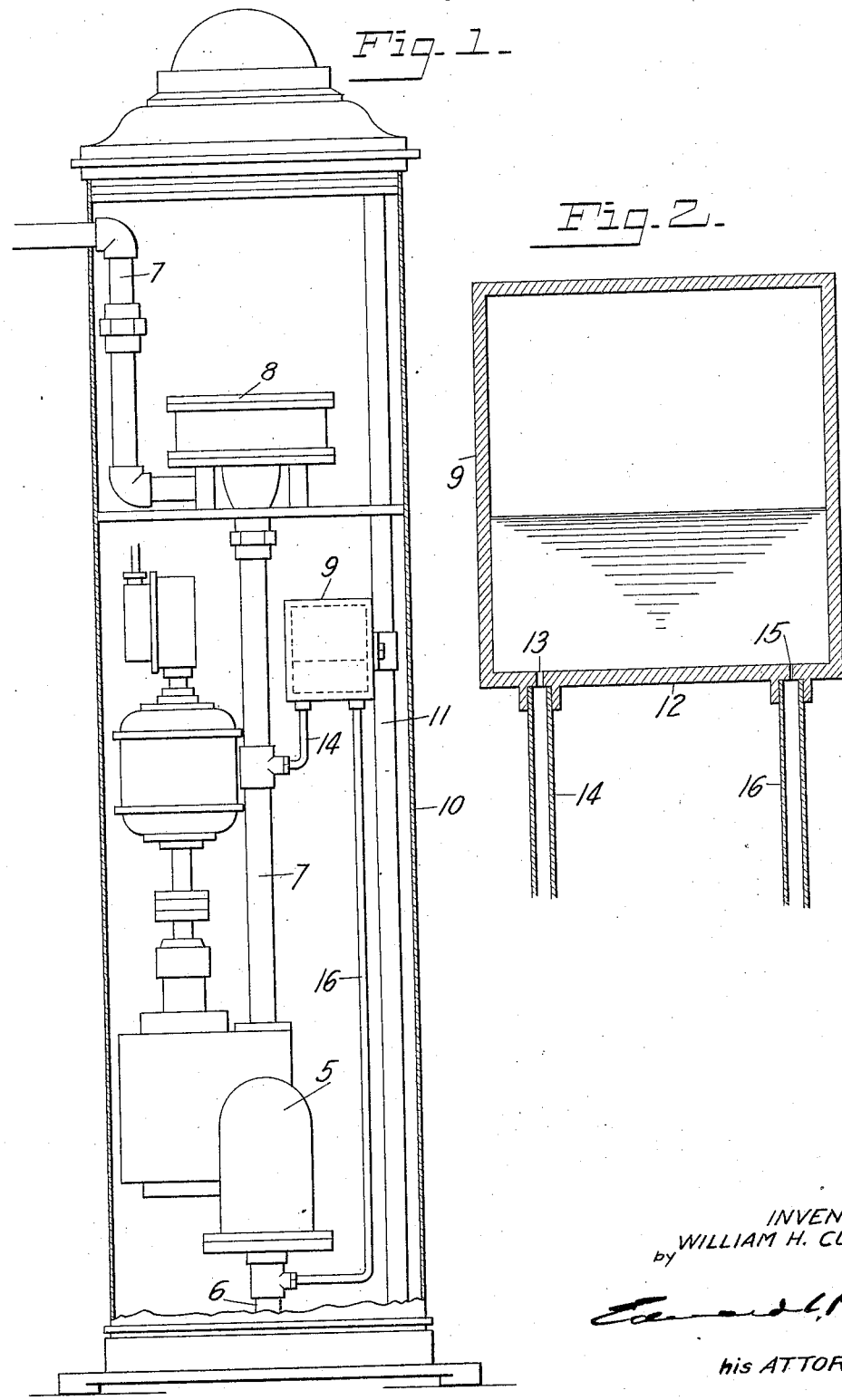
INVENTOR.
WILLIAM H. CURTIS.
by
his ATTORNEY.

Patented Mar. 7, 1933

1,900,333

UNITED STATES PATENT OFFICE

WILLIAM H. CURTIS, OF DAYTON, OHIO, ASSIGNOR TO NATIONAL PUMPS CORPORATION, OF DAYTON, OHIO, A CORPORATION OF OHIO

PRESSURE CONTROLLING DEVICE FOR A LIQUID DISPENSING APPARATUS

Application filed September 12, 1932. Serial No. 632,693.

This invention relates to a pressure controlling device for a liquid dispensing apparatus and is designed more particularly for use with a gasoline dispensing apparatus.

In certain types of gasoline dispensing apparatus, commonly called gasoline pumps, the discharge or pressure line remains full of gasoline between delivery operations and is subject to atmospheric temperatures. The gasoline is delivered to the pressure line from an underground reservoir where its temperature usually is substantially different from atmospheric temperature. Gasoline has a high coefficient of expansion and in hot weather when the relatively cool gasoline from the reservoir is pumped into the pressure line and allowed to remain therein for any considerable length of time its temperature will be raised to substantially that of the atmosphere and the gasoline will correspondingly expand in the pressure line. This expansion is sometimes so great as to cause danger of leakage or of breakage in the various parts of the pressure line. On the other hand, in cold weather the gasoline is delivered to the pressure line at a temperature above atmospheric temperature and as it cools off in the pressure line it will contract so that the pressure line will be but partially filled and upon the next delivery the customer will receive short measure. Various devices have been proposed for controlling or compensating for this expansion and contraction of the gasoline but none has been entirely satisfactory.

It is one object of the present invention to provide a liquid dispensing apparatus with a simple and efficient device which will prevent excessive pressures in the pressure line, due to expansion, and which will maintain the pressure line full of liquid in the event of the contraction of the liquid.

A further object of the invention is to provide such a device in the form of an expansion chamber so connected with the pressure line and with the suction line that the liquid in said chamber will at all times be subjected to a substantial pressure.

Other objects of the invention will appear as the device is described in detail.

In the accompanying drawing Fig. 1 is a side elevation of a gasoline dispensing apparatus showing my invention applied thereto; and Fig. 2 is a sectional view taken through the expansion chamber and its connecting devices.

In the drawing I have illustrated one embodiment of my invention and have shown the same as applied to a gasoline dispensing apparatus but it will be understood that the device may take various forms and may be utilized with dispensing apparatus of various kinds without departing from the spirit of the invention.

The particular gasoline dispensing apparatus here shown comprises a motor operated pump 5 which is connected by a suction line 6 with the underground reservoir. A discharge or pressure pipe 7 leads from the pump to the point of discharge and usually comprises in part a flexible hose, not here shown, having at its discharge end a valve controlled nozzle. A meter 8 is interposed in the pressure line to measure the quantity of liquid delivered.

The device for controlling the pressure in this dispensing apparatus comprises a casing 9 which constitutes an expansion chamber and is adapted to contain a quantity of gasoline under air pressure. The casing 9 may be mounted in any suitable position with relation to the suction and pressure lines and, as here shown, it is mounted within the casing 10, which encloses the apparatus, by securing the same to an upright standard 11 forming part of the dispensing apparatus. This expansion chamber is connected with both the pressure line and the suction line in such a manner as to provide open communication between the expansion chamber and the two lines. The flow of gasoline to and from the expansion chamber is so controlled as to maintain within the expansion chamber at all times a substantial quantity of gasoline which will be sufficient to compress the air within the upper portion of the expansion chamber and cause this compressed air to exert pressure on the gasoline. In the present construction open passageways lead from the lower portion of the expansion chamber to the pressure line and to the suction line, these passageways being provided with restricted orifices which are of such capacity with relation one to the other and with relation to the pressures created within the dispensing apparatus that the desired quantity of gasoline may be maintained within the expansion chamber. Preferably the bottom 12 of the casing 9 is provided with a small opening 13 which is connected by a conduit 14 with the pressure line 7, the opening 13 constituting a restricted orifice between the conduit and the expansion chamber. The bottom 12 is also provided with a second opening 15 which, in the present instance, is slightly smaller than the opening 13 and this opening 15 is connected by a conduit 16 with the suction line 6, and the opening 15 constitutes a restricted orifice between the conduit 16 and the expansion chamber. The orifices 13 and 15 are of such capacity with relation one to the other and with relation to the pressures in the system as a whole that they will maintain a sufficient quantity of liquid in the expansion chamber to exert the desired pressure on the air therein. The relative capacities of these orifices will vary in different installations and while I have secured excellent results with the relative capacities here shown I have also secured satisfactory results where the orifices were of the same capacity and where the orifice 13 was smaller than the orifice 15.

As has been stated, the passageways between the expansion chamber and the pressure line and the suction line are continuously open. When the pump 5 is operated to deliver liquid a small quantity of this liquid will flow through the conduit 14 into the expansion chamber and a portion of the liquid in the chamber will flow through the conduit 16 to the suction line. When the operation of the pump ceases the flow through the conduit 16 will be interrupted because that conduit is connected with the suction line above the foot valve, and the pressures in the expansion chamber and in the pressure line will be approximately equalized. Should the gasoline in the pressure line expand the excess quantity of gasoline, due to the expansion, will pass through the conduit 14 and orifice 13 into the expansion chamber, thus increasing the quantity of liquid therein and causing the air to be compressed to a higher pressure. The capacity of the chamber is sufficient to take care of a maximum expansion of the gasoline in the pressure line. Should the gasoline in the pressure line contract the pressure of the air within the expansion chamber will force the liquid therefrom into the pressure line, thus maintaining that line full of gasoline at all times. When the pump is again placed in operation after the expansion of the gasoline in the pressure line has increased the pressure within the expansion chamber, that pressure will resist the introduction of additional gasoline into the chamber through the orifice 13 and will expedite the discharge of gasoline from the chamber through the orifice 15. At the end of the delivery operation the pressure within the expansion chamber will have been restored to normal. Likewise when the pump is placed in operation after the contraction of the liquid in the pressure line has lowered the level of the gasoline in the expansion chamber and thus reduced the pressure within the expansion chamber, the gasoline will be delivered from the pressure line to the chamber through the orifice 13 in relatively large quantities and will escape more slowly through the orifice 15, thus restoring the normal level of the liquid and pressure within the chamber. Consequently the expansion chamber will at all times contain a quantity of liquid sufficient to maintain the air in the expansion chamber under a substantial pressure. Ordinarily some free air will enter the expansion chamber through the orifice 15 along with the gasoline which would tend to increase the amount of air in the chamber but the increased pressure thus created will cause increased quantities of air to be absorbed by or dissolved in the gasoline and to flow out of the chamber along with the gasoline. Consequently the amount of air in the expansion chamber is never increased to an extent sufficient to objectionably lower the level of the liquid therein. It will be apparent when the pump is in operation some of the gasoline from the pressure line will be by-passed through the expansion chamber back to the suction line but the quantity of gasoline so by-passed is so small that it will not appreciably affect the delivery of gasoline by the apparatus and inasmuch as the chamber is connected with the pressure line in advance of the meter it will not affect the measured quantity of gasoline delivered.

I wish it to be understood that while the expansion chamber will contain only atmospheric air and gasoline when it is first placed in operation this air will, during the operation of the device, be mixed with or displaced by gases and vapors which enter the expansion chamber with the gasoline, and the term "air" as herein used is intended to include any gaseous substance which may rise above the liquid in the chamber.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A controlling device for a dispensing apparatus having a suction line and a pressure line, comprising an expansion chamber adapted to contain liquid and air under pressure, and means for establishing a continuously open connection between said expansion chamber and said pressure line and said suction line and for so controlling the flow of liquid through said connecting means as to maintain in said expansion chamber at all times a quantity of liquid sufficient to substantially compress the air in said expansion chamber.

2. A pressure controlling device for a liquid dispensing apparatus having a suction line and a pressure line, comprising an expansion chamber adapted to contain liquid and air under pressure, and open passageways respectively connecting said expansion chamber with said pressure line and said suction line, said passageways being of such relative capacities as to maintain in said expansion chamber at all times a sufficient quantity of liquid to subject the air therein to substantial pressure.

3. A pressure controlling device for a liquid dispensing apparatus having a suction line and a pressure line, comprising an expansion chamber adapted to contain liquid and air under pressure, and open passageways respectively connecting said expansion chamber with said pressure line and said suction line, the passageway leading to said pressure line being of greater capacity than the passageway leading to said suction line.

4. A pressure controlling device for a liquid dispensing apparatus having a suction line and a pressure line, comprising an expansion chamber adapted to contain liquid and air under pressure, and open passageways respectively connecting said expansion chamber with said pressure line and said suction line and each having a restricted orifice.

5. A pressure controlling device for a liquid dispensing apparatus having a suction line and a pressure line, comprising an expansion chamber adapted to contain liquid and air under pressure, and open passageways respectively connecting said expansion chamber with said pressure line and said suction line and each having a restricted orifice, said orifices being of different capacities.

6. A pressure controlling device for a liquid dispensing apparatus having a suction line and a pressure line, comprising an expansion chamber adapted to contain liquid and air under pressure, and open passageways respectively connecting said expansion chamber with said pressure line and said suction line and each having a restricted orifice, said orifices being of such capacities with relation one to the other and with relation to the pressures in said dispensing apparatus that the liquid in said chamber will be maintained at a level sufficiently high to exert pressure on the air in said chamber.

7. A controlling device for a dispensing apparatus having a suction line and a pressure line, comprising an expansion chamber adapted to contain liquid and air under pressure, said chamber having in the lower part thereof two relatively small orifices, and open conduits connecting said orifices respectively with said pressure line and with said suction line.

In testimony whereof, I affix my signature hereto.

WILLIAM H. CURTIS.